US012065390B2

(12) United States Patent
Barros Covarrubias et al.

(10) Patent No.: US 12,065,390 B2
(45) Date of Patent: Aug. 20, 2024

(54) ENERGISING AGRICULTURAL FERTILISER COMPOSED OF SUCROSE, HUMIC ACID AND PROTEIN

(71) Applicant: POWER ROOTS SPA, Santiago (CL)

(72) Inventors: Maria del Pilar Barros Covarrubias, Santiago (CL); Alfredo Barros Opazo, Santiago (CL); Felipe Barros Opazo, Santiago (CL); Hernan Villalobos Barcelo, Santiago (CL); Eduardo Conca Calvo, Santiago (CL)

(73) Assignee: POWER ROOTS SPA, Santiago (CL)

( * ) Notice: Subject to any disclaimer, the term of this patent is extended or adjusted under 35 U.S.C. 154(b) by 200 days.

(21) Appl. No.: 17/604,274

(22) PCT Filed: Nov. 17, 2020

(86) PCT No.: PCT/CL2020/050156
§ 371 (c)(1),
(2) Date: Oct. 15, 2021

(87) PCT Pub. No.: WO2021/102595
PCT Pub. Date: Jun. 3, 2021

(65) Prior Publication Data
US 2022/0213002 A1   Jul. 7, 2022

(30) Foreign Application Priority Data
Nov. 26, 2019  (CL) .................................. 3454-2019

(51) Int. Cl.
C05F 11/02   (2006.01)
C05F 1/00    (2006.01)
(Continued)

(52) U.S. Cl.
CPC .............. *C05F 11/02* (2013.01); *C05F 1/005* (2013.01); *C05F 1/007* (2013.01); *C05F 11/00* (2013.01); *C05G 5/23* (2020.02)

(58) Field of Classification Search
CPC .......... C05F 11/02; C05F 1/005; C05F 1/007; C05F 11/00; C05G 5/23; A01N 33/00; A01N 43/08; A01N 43/16; A01N 59/00
See application file for complete search history.

(56) References Cited

U.S. PATENT DOCUMENTS 2,950,961 A * 8/1960 Striplin, Jr. .............. C05D 9/00
                                                        71/42
2005/0245398 A1   11/2005 Stock
(Continued)

FOREIGN PATENT DOCUMENTS

CL   199401901 A1   2/1996
CL   199600205 A1   10/1996
(Continued)

OTHER PUBLICATIONS

Evans, Michael. "Greenhouse Management". Substrates. Unit 7 (2014) (Year: 2014).*
M A Clarke. Syrups. (2003). Encyclopaedia of food science, food technology and nutrition: vols. 1-8. Academic Press. (Year: 2003).*
Menegat, Mariana B., Robert D. Goodband, Joel M. DeRouchey, Mike D. Tokach, Jason C. Woodworth, and Steve S. Dritz. 2019. Kansas State University Swine Nutrition Guide: Protein Sources for Swine Diets. (Year: 2019).*
(Continued)

*Primary Examiner* — Jennifer A Smith
(74) *Attorney, Agent, or Firm* — LUCAS & MERCANTI, LLP

(57) ABSTRACT

An agricultural energising biostimulating composition made from sucrose, protein/hydrolised protein, and humic acid. The composition is aimed at solving the energy deficit that is affecting the production of fruit and vegetables in the agriculture industry. Plants do not obtain the energy they need for their development, which affects the quality and quantity of the fruit produced.

11 Claims, 1 Drawing Sheet

(51) Int. Cl.
*C05F 11/00* (2006.01)
*C05G 5/23* (2020.01)

(56) References Cited

U.S. PATENT DOCUMENTS

| | | | | |
|---|---|---|---|---|
| 2006/0188978 A1* | 8/2006 | Grant | ............... | B09B 3/00 |
| | | | | 435/252.5 |
| 2009/0082205 A1* | 3/2009 | Stock | ............... | C05D 9/02 |
| | | | | 435/243 |
| 2010/0272701 A1* | 10/2010 | Chen | ............... | C05F 11/08 |
| | | | | 71/6 |
| 2016/0145651 A1* | 5/2016 | Kurihara | ............... | C12P 19/14 |
| | | | | 435/162 |

FOREIGN PATENT DOCUMENTS

| | | | |
|---|---|---|---|
| CL | 200402945 A1 | | 3/2006 |
| CL | 201200775 A1 | | 1/2013 |
| CN | 105036905 A | * | 11/2015 |
| CN | 109956825 A | | 7/2019 |
| KR | 1481767 B1 | * | 1/2015 |
| WO | 2011028975 A2 | | 3/2011 |
| WO | 2014158912 A1 | | 10/2014 |
| WO | 2016132000 A1 | | 8/2016 |

OTHER PUBLICATIONS

Search Report for Corresponding Chilean Patent Application No. 201903454, Nov. 14, 2020, 4 pages, English translation 3 pages.
Certificate of Chilean Patent No. 201903454, Feb. 9, 2023, issued by the Instituto Nacional de Propiedad Industrial (INAPI) of Chile.
Granted Claims for Chilean Patent No. 201903454.
Registration Number Assignment Resolution (Issue Notification) dated Feb. 9, 2023, issued by the Instituto Nacional de Propiedad Industrial (INAPI) of Chile.
Resolution of Acceptance to Registration (Notice of Allowance) dated Jan. 26, 2023, issued by the Instituto Nacional de Propiedad Industrial (INAPI) of Chile.
P. Du Jardin, Plant biostimulants: Definition, concept, main categories and regulation; Scientia Horticulturae 196; 2015; 3-14; http://dx.doi.org/10.1016/j.scienta.2015.09.021.
Fertilizantes foliares Maquisa. Producto "PK MAQ Aug. 15, 2016", 2010; http://funica.org.ni/index/boletin/BOLETIN%20NUEVO/PDF/Fertilizantes_Foliares.pdf.
H. Veobides, et al; Revision bibliografica Las Sustancias Humicas Como Bioestimulantes De Plantas Bajo Condiciones De Estres Ambiental; Cultivos Tropicales, 2018, vol. 39; No. 4; pp. 102-109.
International Search Report for Corresponding International Application No. PCT/CL2020/050156 dated Feb. 18, 2021.

* cited by examiner

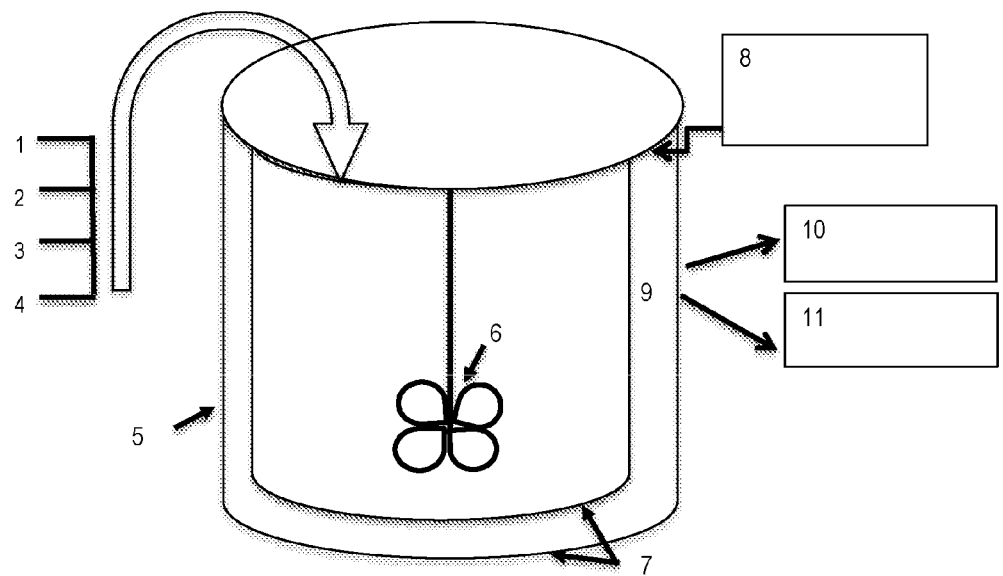

ENERGISING AGRICULTURAL FERTILISER COMPOSED OF SUCROSE, HUMIC ACID AND PROTEIN

CROSS REFERENCE TO RELATED APPLICATION

This Application is a 371 of PCT/CL2020/050156 filed on Nov. 17, 2020, which claimed priority of Chilean Patent Application 3454-2019, filed Nov. 26, 2019, both of which are incorporated herein by reference.

FIELD OF THE INVENTION

The present invention is intended for use in the general field of products used as agricultural inputs. In particular, it relates to an agricultural energizing biostimulating composition made from sucrose, protein/hydrolyzed protein, and humic acid.

The composition is aimed at solving the energy deficit that is affecting the production of fruit and vegetables in the agriculture industry. Plants do not obtain the energy they need for their development, which affects the quality and quantity of the fruit produced.

BACKGROUND OF THE INVENTION

Currently, farmers use biostimulants and fertilizers, focused on plant nutrition, these have a high and varied content of primary macronutrients such as: Nitrogen, Phosphorus, Potassium, secondary; Calcium and Magnesium; and micronutrients such as: Iron, Copper, Zinc, Boron and Manganese. These fertilizers are applied in a foliar way or via irrigation, in the different stages of plant growth so that the plants can assimilate them through their leaves or roots. After assimilating the nutrients, they must transform them into energy to activate their metabolism, and thus go from one phenological state to another until reaching the fruit production.

When plants are stressed by the different conditions of the environment, they fail to assimilate or transform the nutrients that common fertilizers provide, which makes it difficult for them to carry out their metabolic activities and thus pass from one phenological state to another, to achieve a correct flowering, buds, fruit set, fruit filling and final fruit.

Some of the factors that stress plants are climatic changes, pests, microbes, diseases, environmental pollution, water resources, high temperatures, UV radiation, low fertility and/or soil contamination; affecting them in a physiological and biochemical way, generating a metabolic imbalance, which makes it difficult for them to assimilate nutrients, to later transform them into energy, and thus generate energy for their metabolic processes.

For example, UV-B radiation damages the leaves, burns them, causing a loss of photosynthesis capacity, further, it damages the chlorophyll of the leaves (photo-receptor pigment responsible for transforming the energy of sunlight into natural chemical energy for plant). The main objective of photosynthesis in the plant is the generation of glucose, which is the main source of plant energy, necessary for all its metabolic processes.

A plant stressed by any of the aforementioned factors presents an energy deficit, which is solved by the composition that serves as energy, since it is assimilated and used directly by the plant, it does not require a transformation process due to its vegetal nature. A plant with energy will have no problem in passing from one phenological state to another, achieving good flowering, budding, fruit set, fruit filling and finished fruit, thus solving the problem that is affecting the agricultural industry in its productive deficit.

On the other hand, and at the subsoil level, the use of chemical fertilizers in agriculture alters and kills thousands of microorganisms which play a leading role, the transformation of the nutrients and organic matter contained in the different substrates and also in the symbiosis, where they feed the plants through their roots. A soil low in microorganism is a soil with low fertility.

Our agricultural energizing biostimulant. Is also food for soil microorganisms, so that they reproduce exponentially, thus increasing soil fertility and the transformation of nutrients so that they are assimilated by plants.

In the agricultural market there are no energizers for plants and soil microorganisms, which solve the problem caused by the energy deficit, since most of the products are focused on nutrition.

It is known, for example, under registration 196500656, classification C05C9/00 and C05G1/00 a method for the preparation of a complete multimineralized agricultural fertilizer, which is why it is made based on macro and miconutrients focused on plant nutrition. Thus, this product is not an agricultural energizing biostimulant.

Another example, under registration 199501598, classification A01G31/00, A01N37/16 and A01N59/00 an agricultural composition for use as fertilizers and foliar fertilizers, which contain as constituents, a weight/weight portion of about 16% of NITROGEN, and the process of obtaining said composition, as in the previous example, this compound is made based on micro and macronutrients focused on plant nutrition. Thus, this product is not an agricultural energizing biostimulant.

SUMMARY OF THE INVENTION

The present invention solves the problems described in the state of the art, since it provides an agricultural energizing biostimulant composition. Which delivers the necessary energy to the plants to supply the energy deficit caused by different stress factors. The composition delivers immediate assimilation energy, the energy that they have not been able to generate, their glucose, so that it achieves its correct development and growth, and thus achieving a good fruits production.

Thus, in a first aspect the present invention refers to an agricultural energizing biostimulant composition (hereinafter composition of the present invention), comprising carbohydrates, hydrolyzed protein/protein and humic acids, for use as energizer, biostimulant or agricultural fertilizer.

A particular aspect, the composition of the present invention, comprises carbohydrates which may be sucrose, fructose or glucose, preferably a combination of glucose and fructose. Presenting between 20%-50% of total sugars in its composition, (Expressed as Glucose): Association of Official Agricultural Chemists (AOAC), Official Method AOAC Code 1995 935.62.-906.03.

In a more particular aspect, the composition of the present invention does not require preservatives or additives to be preserved, since its high sugar level does not allow the appearance of microorganisms, which would decompose the composition.

Furthermore, another particular aspect, the composition of the present invention, comprises protein, which may be of animal or vegetable origin. Within the animal proteins they may be based on whey, casein, collagen, albumin or meat protein. Among the proteins of vegetable origin, protein from soy, pumpkin, rice, peas or hemp can be used. Hydrolyzed protein is preferably used, since it is more soluble in water, has greater stability, higher amino acid content and is biologically better assimilated by the plant where it acts.

In addition, another particular aspect, the composition of the present invention, it contains by weight of non-fat solid matters, carbohydrates 249 to 3,535 g/l, hydrolyzed proteins 5 to 100 g/l and humic acid 20 to 200 g/l.

Another more particular aspect, the composition of the present invention, has a low content of macronutrients, the following nutrients N, $P_2O_5$, $K_2O$, each one represents between 0-1% of it.

In a second aspect, the present invention refers to a process, (hereinafter, the process of the present invention) for obtaining the composition of the invention that comprises the following steps:

a) Preparation of an initial saturated solution containing: carbohydrates, protein, humic acid and water, in an autoclave machine with stirrer and double jacket;
b) Raising the temperature of the water found in the double layer of the autoclave, using a boiler, to dissolve the solution through indirect heat;
c) Adding stirring to step b) from the beginning, and thus homogenize the saturated solution from step a);
d) Continue for at least 8 hours the process of raising the temperature indirectly with stirring, described in steps b) and c).
e) After completing step d) the boiler is turned off and stirring is continued until the mixture reaches room temperature. Thus, achieving the composition of the present invention In a particular aspect, the composition of the present invention, after having completed step e) (final step); is characterized by having a density between 1.1-2.1 g/ml and an acid pH, between 4.5 and 6.

In another more particular aspect, the process of the present invention only involves physical transformations of matter, it does not involve chemical changes.

BRIEF DESCRIPTION OF THE FIGURE

FIG. 1 represents a diagram of the procedure for obtaining the composition of the present invention.

DETAILED DESCRIPTION OF THE INVENTION

The composition of the present invention refers itself to a production process based on sucrose, hydrolyzed proteins, and humic acids, which is a direct source of energy for plants, due to its high content of vegetable carbohydrates and proteins, it acts like the glucose that plants should generate in their balanced state, which is their main source of energy for all their metabolic processes, necessary in the different stages of their life.

Example 1: Composition and preparation procedure of the composition of an agricultural energizing biostimulant based on carbohydrates, hydrolyzed protein and humic acid. Using hydrolyzed collagen as a protein source.

The manufacture of the agricultural energizing biostimulant composition of the invention is described as follows:

200 kg of sugar (1) are incorporated, as well as 5 kg of humic acids (2), and 1 kg of hydrolyzed collagen (3), in 100 liters of distilled water (4) inside the autoclave (5) with stirrer (6) and double jacket (7).

To homogenize the mixture, the temperature must be raised to 70° C., using a boiler (8) that provides indirect heat, raising the temperature of the water (9) that is between the double layer, further, this process must be complemented with agitation. After 8 hours in the stirring process and at temperatures of 70° C., the mixture achieves a homogeneous consistency. To end this process, only stirring is continued until the product is brought to room temperature.

After the product is homogeneous and at room temperature, the packaging is carried out, with packaging machines (10) or pumps (11), depending on the format.

TABLE 1

| Ingredients | Range |
| --- | --- |
| Sucrose (Glucose and Fructose) | 249-3,535 g/l |
| Hydrolyzed collagen | 5-100 g/l |
| Humic acids | 20-200 g/l |

Illustration in FIG. 1, Annex at the End of the Description

Example 2: Composition and preparation procedure of the composition of an agricultural energizing biostimulant based on carbohydrates, hydrolyzed protein and humic acid. Using hydrolyzed whey as protein source.

The manufacture of the agricultural energizing biostimulant composition is described as follows:

200 kg of sugar (1) are incorporated, as well as 5 kg humic acids (2), and 1 kg of hydrolyzed whey (3), in 100 liters of distilled water (4) inside the autoclave (5) with stirrer (6) and double jacket (7).

To homogenize the mixture, the temperature must be raised to 70° C., using a boiler (8) that provides indirect heat, raising the temperature of the water (9) that is between the double layer, in addition this process must be complemented with agitation.

After 8 hours in the stirring step and at temperatures of 70° C., the mixture achieved a homogeneous consistency. To end this process, only stirring is continued until the product is brought to room temperature.

After the product is homogeneous and at room temperature, the packaging is carried out, with packaging machines (10) or pumps (11), depending on the format.

TABLE 2

| Ingredients | Range |
| --- | --- |
| Sucrose (Glucose and Fructose) | 249-3,535 g/l |
| Hydrolyzed whey | 5-100 g/l |
| Humic acids | 20-200 g/l |

Illustration in FIG. 1, Annex at the End of the Description

Example 3: Composition and preparation procedure of the composition of an agricultural energizing biostimulant based on carbohydrates, protein and humic acid. Using albumin as a protein source.

The manufacture of the composition, energizing agricultural fertilizer, is described as follows:

200 kg of sugar (1) are incorporated, as well as 5 kg humic acids (2), and 1 kg of albumin (3), in 100 liters of distilled water (4) inside the autoclave (5) with stirrer (6) and double jacket (7).

To homogenize the mixture, the temperature must be raised to 70° C., using a boiler (8) that provides indirect heat by raising the temperature of the water (9) that is between the double layer, in addition this process must be complemented with agitation.

After 10 hours in the stirring step, since the protein used has less solubility than a hydrolyzed one, and at temperatures of 70° C., the mixture achieves a homogeneous consistency. To end this process, only stirring is continued until the product is brought to room temperature.

After the product is homogeneous and at room temperature, the packaging is carried out, with packaging machines (10) or pumps (11), depending on the format.

TABLE 3

| Ingredients | Range |
| --- | --- |
| Sucrose (Glucose and Fructose) | 249-3,535 g/l |
| Albumin | 5-100 g/l |
| Humic acids | 20-200 g/l |

Illustration in FIG. 1, Annex at the End of the Description

Example 4: Use of the composition of the present invention as an agricultural energizing biostimulant, to deliver energy to Cherry Trees and thus achieve a greater and faster shoot growth.

History: Santana cherry graft holder nursery, located in the Sixth Region of Chile, in the town of Graneros. The nursery presents low development (in the second leaf stage), this could be explained by nematodes, inheritance from previous orchards and possible allelopathies.

Objective: To deliver the necessary energy to the plants through the developed composition, to activate their own growth and production.

In this assay, measurements of the shoots were carried out in the control nursery orchard (without treatment), and in the nursery orchard treated with the agricultural energizing biostimulant composition. 20 plants will be used as a representative sample of each group, which their shoot growth will measured in centimeters, then it will be evaluated what percentage of this group is in a certain growth range, indicated in the evaluation table Table 4: of growth evaluation of Santana cherry metropolitan region (%)

| | Day 0 | Measurement 1 | Measurement 2 | Measurement 3 | Measurement 4 | Measurement 5 |
| --- | --- | --- | --- | --- | --- | --- |
| Date | 20 Sep. 2019 | 10 Oct. 2019 | 30 Oct. 2019 | 10 Nov. 2019 | 30 Nov. 2019 | 10 Dec. 2019 |
| Shoot (cm) | | 10-15 cm | 20-30 cm | 40-50 cm | 60-70 cm | 80 > cm |
| Control without treatment | | 100% | 10% | 0% | 0% | 0% |
| Composition treatment | 1$^{st}$ application | 100% | 90% | 90% | 90% | 90% |

Example 5: Use of the composition of the present invention as an energizing agricultural biostimulant, to deliver energy to the walnut trees and thus achieve an increase in the diameter/size of the fruits.

History: Orchard with even in its vegetative growth, presents water stress as a result of the situation that exists in this town of Chacabuco in the Metropolitan Region.

Objective

It is expected to activate the plant from the beginning of root activity and to partially supply the energy deficit caused by abiotic water stress.

In this test we will demonstrate that, in the application of the program with the composition, the diameter of the walnut fruits increases significantly, in addition to making it remain more active until the fruit is finished.

Test:

Significant differences are observed in each of the fruits in the test sample comparing the control with the sample treated with the agricultural energizing biostimulant composition.

Comparing the control versus the treatment, differences of almost 6 mm in diameter are observed, with a 26.1% increase in sample point A. For point B, 1 mm in diameter and 4.43% increase; Point C, 5.2 mm in diameter and 24.5%; Point D, 7.5 mm in diameter and 34.2%. The initial average diameter for all the control fruits was 16.9 mm, compared to 17 mm for the treatment with the composition, therefore, there is no significant difference in this aspect (see Table 5).

TABLE 5

Table of millimeters (mm) and Percentages (%)

| | Sampling points control table | | | |
| --- | --- | --- | --- | --- |
| Control | A | B | C | D |
| Initial | 16.8 | 15.9 | 17.8 | 17.4 |
| Final | 38.9 | 38.7 | 38.8 | 39.3 |
| Growth | 22.1 | 22.8 | 21.1 | 21.9 |

| | Sampling points composition treatment table | | | |
| --- | --- | --- | --- | --- |
| Treatment | A | B | C | D |
| Initial | 15.6 | 19.4 | 17.8 | 15.2 |
| Final | 43.6 | 43.2 | 44.1 | 44.5 |
| Growth | 28 | 23.8 | 26.3 | 29.4 |

Note:
Points A; B; C; D, correspond to measurements averages of the fruits, carried out in four cardinal points of the Orchard.

Example 6: Use of the composition of the present invention as an agricultural energizing biostimulant to deliver energy to avocados and thereby minimize fruit drop due to abiotic stress effects, improve flowering, fruit set and harvest.

Physiological Antecedents of Avocados:

The flowering and fruit setting process in Hass avocados has been widely studied and it has been sought, with highly variable results, to increase production in a stable manner over time.

Whiley, Lovatt, Wolstenholme, I. Hormaza, Gardiazabal and others have studied in detail the phenology and the process of flowering, fruit set and final fruit set. The conclusion is that it is a complex process that depends on many internal factors of the tree, the climate, the presence of pollen and pollinating agents, among others.

Specific data: The avocado produces up to a million flowers, from this, if everything works more or less; CCCo of a normal framework, an initial pollination/fruit set of less than 1% can be obtained.

Finally, after the second summer fall, the final fruit set, if we consider the initial number of flowers, can vary between 0.04-0.02% or less in some cases of stress.

The initial number of flowers and their quality greatly influence the final number of fruits to be harvested.

The most common plantation frames in Chile vary between 833 and 416, with many high-density plantations having 1000 to 1333 trees/ha.

Therefore, depending on the number of trees/ha, the number of fruits per tree can range from 250 to 90, to produce 20 tons/ha, which is considered a good production.

The potential should be between 300 to 120 depending on the plantation framework to achieve productions between 24 to 28 tons/ha.

Smaller trees in high density plantation frames (1000 to 1333 trees/ha) should set about 120 fruits/tree, and in medium to low densities, they should produce between 300 to 400 fruits per tree.

The other detail that needs to be clarified is that not all trees produce well every year (biennial bearing), so the real challenge to obtain good productions is that the productive trees manage to set over 200 and 500 fruits according to their size.

Having clarified all this, it is clear that the final % of setting, if we start with a universe of 10,000 flowers, should be between 0.05 to 0.02% depending on the size of the trees.

One of the points most mentioned by researchers is in the reserves of starch and other carbohydrates. The largest reserves are achieved in winter without active shoots and without flowering. These reserves diminish rapidly during flowering/fruit set, fruit development, shoot and root growth, reaching a minimum in late summer/fall during the second flash of vegetative development.

The next season's flowering depends largely on the tree's starch reserves and other carbohydrates that the tree has at the beginning of the winter. The quality of the flower depends a lot on its size and the carbohydrate reserve it contains.

There are some works that directly relate the carbohydrate reserves in the flowers at the time of fruit set, and the final production of the fruit.

All this information motivated us to develop the agricultural biostimulant and energizing to composition, in order to improve the quality of flowering and the final setting of the fruit, i.e., greater stable productions over time. From the study of flowering/fruit set, an application plan is developed, seeking to satisfy the energy needs of the avocado, at its key moments.

Via Soil, Composition Assay

| Month | Phenological stage | Objective | Dose l/ha | Control initial fruit set % | assay |
|---|---|---|---|---|---|
| August/Sept | Cauliflower bud | Support flower onset | 5 to 7 | 0.00% | 0.00% |
| Sept/Oct | Flower onset | Support initial fruit development | 5 to 7 | 0.05% | 0.08% |

Via Leaf: Composition Assay

| Month | Phenological stage | Objective | Dose l/ha | Control initial fruit set % | assay |
|---|---|---|---|---|---|
| Sept/Oct | Flower onset | Support flower onset | 1 to 1.5 | 0.00% | 0.00% |
| Sept/Oct | 10 days from flower onset | Support flower/fruit set | 1 to 1.5 | 0.05% | 0.08% |
| October | 10 days from flower onset | Support flower/fruit set | 1 to 1.5 | 0.03% | 0.07% |
| Oct/Nov | Flower end | Support fruit set | 1 to 1.5 | 0.025% | 0.06% |

After these applications and depending on the climatic conditions, the load achieved in December and the state of the orchard, it is possible to make a new application plan, aiming to avoid the second fall of fruits, to shift the curve of fruit sizes. and thereby ensuring the production per hectare, and finally ensure a good flowering for the following season.

Via Soil, Composition Assay

| Month | Phenological stage | Objective | Dose l/ha | Control initial fruit set % | Assay |
|---|---|---|---|---|---|
| Dec/January | Fruit set/fruit cellular division | Support fruit set | 5 to 7 | 0.025% | 0.06% |
| February | Fruit growth | Support fruit development and set | 5 to 7 | 0.02% | 0.06% |
| March | Fruit growth | Fruit growth and reserves | 5 to 7 | 0.02% | 0.06% |

We took 200 g fruits as a base. And we think that both treatments contemplate the use of foliar fertilization and growth regulators.

Base 10,000 initial flowers.

The invention claimed is:

1. An agricultural energizing biostimulating aqueous composition for plants comprising consisting of 249 to 3,535 g/L of sucrose, 5 to 100 g/L of protein or hydrolyzed protein, 20 to 200 g/L humic acids and water.

2. The composition according to claim 1, wherein the protein is of animal or vegetable origin.

3. The composition according to claim 2, wherein the protein of animal origin is based on whey, casein, collagen, albumin, or meat protein.

4. The composition according to claim 2, wherein the protein of vegetable origin is from soy, pumpkin, rice, peas, or hemp.

5. The composition according to claim 2, wherein the protein is a hydrolyzed protein.

6. The composition according to claim 1, wherein the composition does not comprise preservatives or additives for conservation.

7. The composition according to claim 1, wherein the composition comprises between 20%-50% of total sugars in the composition, expressed as glucose.

8. The composition according to claim 1, wherein the composition consists of 2,000 g/L of sucrose, 10 g/L of hydrolyzed proteins and 50 g/L humic acids.

9. The composition according to claim 1, wherein the composition has a content of macronutrients, of the type N, $P_2O_5$, $K_2O$, in an amount which varies between 0% to 1% of the total weight of the composition.

10. The composition according to claim 1, wherein the composition has a density between 1.1 and 2.1 g/ml and an acid pH, comprised between 4.5 and 6.

11. A process for obtaining the composition according to claim 1, comprising the following steps:
   a) preparing an initial saturated solution containing: sucrose, protein, humic acid and water, in an autoclave machine with a stirrer and a double jacket;
   b) raising a temperature of water found in a double layer of the autoclave, using a boiler, to dissolve the saturated solution through indirect heat;
   c) adding stirring to step b) from a beginning to homogenize the saturated solution from step a);
   d) continuing for at least 8 hours the process of raising the temperature indirectly with stirring, described in steps b) and c); and
   e) after completing step d) turning off the boiler and continuously stirring until the mixture reaches room temperature, thus obtaining the agricultural energizing biostimulating aqueous composition.

* * * * *